United States Patent
Chopard et al.

(10) Patent No.: US 12,179,632 B2
(45) Date of Patent: Dec. 31, 2024

(54) THERMAL MANAGEMENT STRUCTURE WITH INTEGRATED CHANNELS

(71) Applicant: HUTCHINSON, Paris (FR)

(72) Inventors: Fabrice Chopard, Saint Martin d'Heres (FR); Clément Blanchard, Amilly (FR)

(73) Assignee: HUTCHINSON, Paris (FR)

( * ) Notice: Subject to any disclaimer, the term of this patent is extended or adjusted under 35 U.S.C. 154(b) by 974 days.

(21) Appl. No.: 17/188,570

(22) Filed: Mar. 1, 2021

(65) Prior Publication Data

US 2021/0188128 A1 Jun. 24, 2021

Related U.S. Application Data

(63) Continuation-in-part of application No. PCT/FR2019/052013, filed on Sep. 2, 2019.

(30) Foreign Application Priority Data

Aug. 31, 2018 (FR) ..................................... 1857878

(51) Int. Cl.
*B60L 58/26* (2019.01)
*B60K 6/28* (2007.10)
(Continued)

(52) U.S. Cl.
CPC .............. *B60L 58/26* (2019.02); *B60L 50/64* (2019.02); *F28D 20/02* (2013.01); *F28F 3/086* (2013.01); *H01M 10/0525* (2013.01); *H01M 10/613* (2015.04); *H01M 10/625* (2015.04); *H01M 10/6556* (2015.04); *H01M 10/6557* (2015.04); *H01M 10/658* (2015.04);
(Continued)

(58) Field of Classification Search
CPC ... H01M 50/24; H01M 10/6557; B60L 58/26; B60L 50/64
See application file for complete search history.

(56) References Cited

U.S. PATENT DOCUMENTS

| | | | |
|---|---|---|---|
| 9,905,821 B2 * | 2/2018 | Eberhard | ............ H01M 50/522 |
| 2016/0006088 A1 * | 1/2016 | Boetcher | ................ F28D 20/02 |
| | | | 165/80.2 |
| 2019/0011198 A1 * | 1/2019 | Feldkeller | ........... G03F 7/70925 |

FOREIGN PATENT DOCUMENTS

| | | | | |
|---|---|---|---|---|
| FR | 3015780 A3 * | 6/2015 | .......... B60L 11/1875 |
| FR | 3039561 A1 | 2/2017 | |

(Continued)

OTHER PUBLICATIONS

International Patent Application No. PCT/FR2019/052013, International Search Report and Written Opinion dated Dec. 18, 2019, 10 pgs.

*Primary Examiner* — Karie O'Neill Apicella
(74) *Attorney, Agent, or Firm* — Cozen O'Connor

(57) ABSTRACT

The invention relates to a structure comprising at least one thermal management element comprising : a composite body (3) containing at least one phase change material (PCM) in a structuring rigid matrix, so that the composite body is self-supporting regardless of the phase of the phase change material contained, and/or a plastic or metal bag, gas-tight and under partial internal vacuum, having a shape maintained by the internal vacuum, the composite body (3) and/or the bag being shaped so as locally to present externally at least one elongated cavity (11) which by itself defines a channel wall (13) suitable for the circulation of a fluid.

19 Claims, 11 Drawing Sheets

(51) Int. Cl.
*B60L 50/64* (2019.01)
*F28D 20/02* (2006.01)
*F28F 3/08* (2006.01)
*H01M 10/0525* (2010.01)
*H01M 10/613* (2014.01)
*H01M 10/625* (2014.01)
*H01M 10/6556* (2014.01)
*H01M 10/6557* (2014.01)
*H01M 10/658* (2014.01)
*H01M 10/659* (2014.01)
*H01M 50/204* (2021.01)
*H01M 50/213* (2021.01)
*H01M 50/227* (2021.01)
*H01M 50/24* (2021.01)
*H01M 50/249* (2021.01)
*H01M 50/289* (2021.01)

(52) U.S. Cl.
CPC ....... *H01M 10/659* (2015.04); *H01M 50/204* (2021.01); *H01M 50/213* (2021.01); *H01M 50/227* (2021.01); *H01M 50/24* (2021.01); *H01M 50/249* (2021.01); *H01M 50/289* (2021.01); *B60K 6/28* (2013.01); *B60Y 2200/91* (2013.01); *B60Y 2200/92* (2013.01); *B60Y 2306/05* (2013.01); *F28F 2255/06* (2013.01); *H01M 2220/20* (2013.01)

(56) References Cited

FOREIGN PATENT DOCUMENTS

| | | |
|---|---|---|
| FR | 3063137 A1 | 8/2018 |
| WO | WO2017153691 A1 | 9/2017 |
| WO | WO2018167382 A1 | 9/2018 |
| WO | WO2020044002 A1 | 3/2020 |

\* cited by examiner

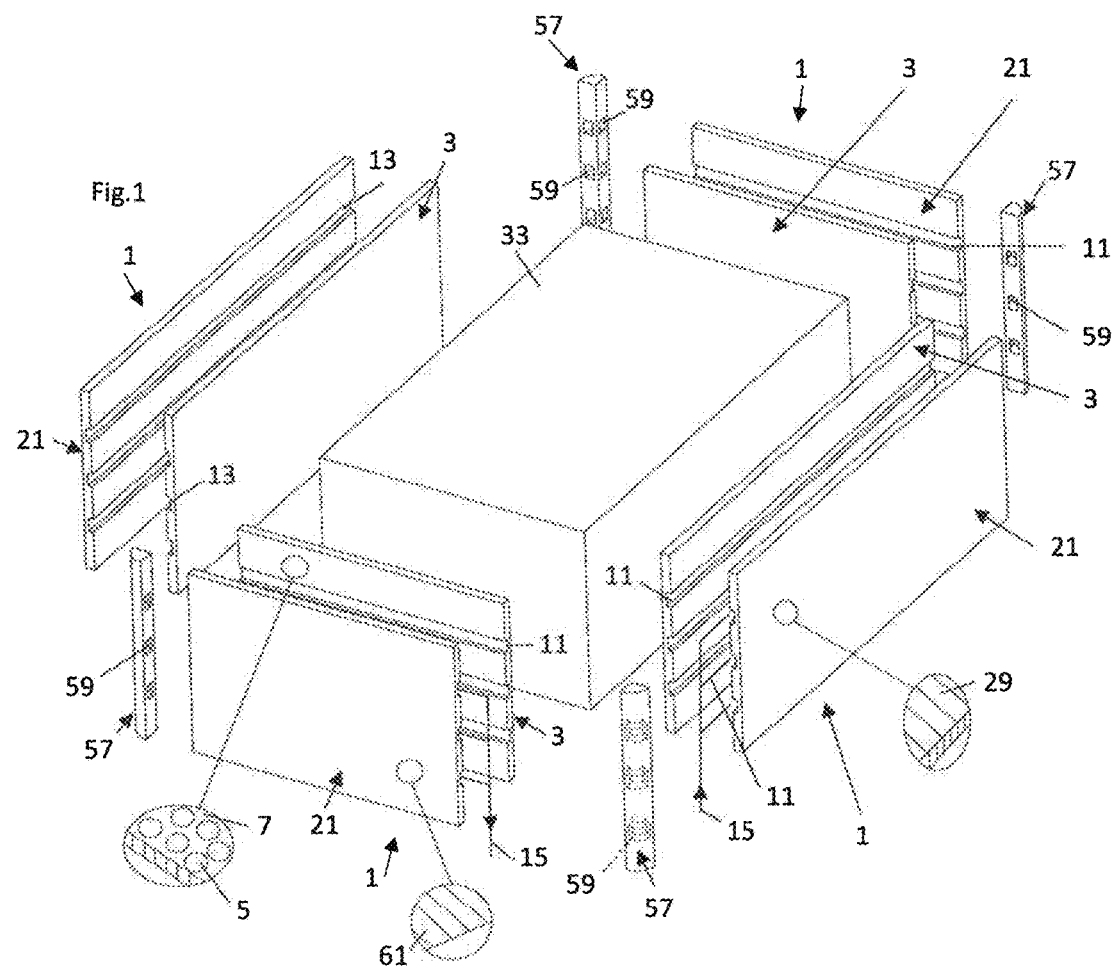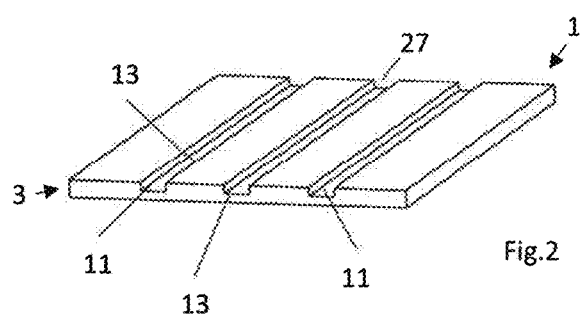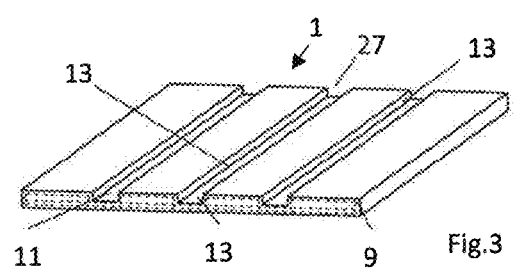

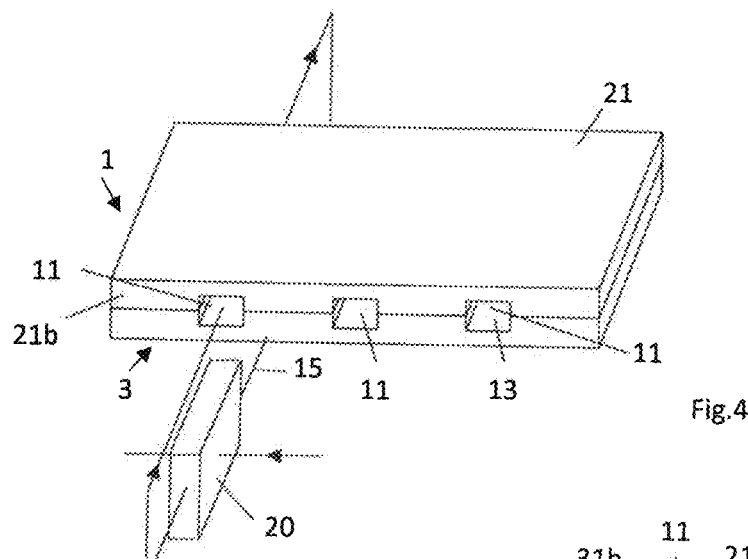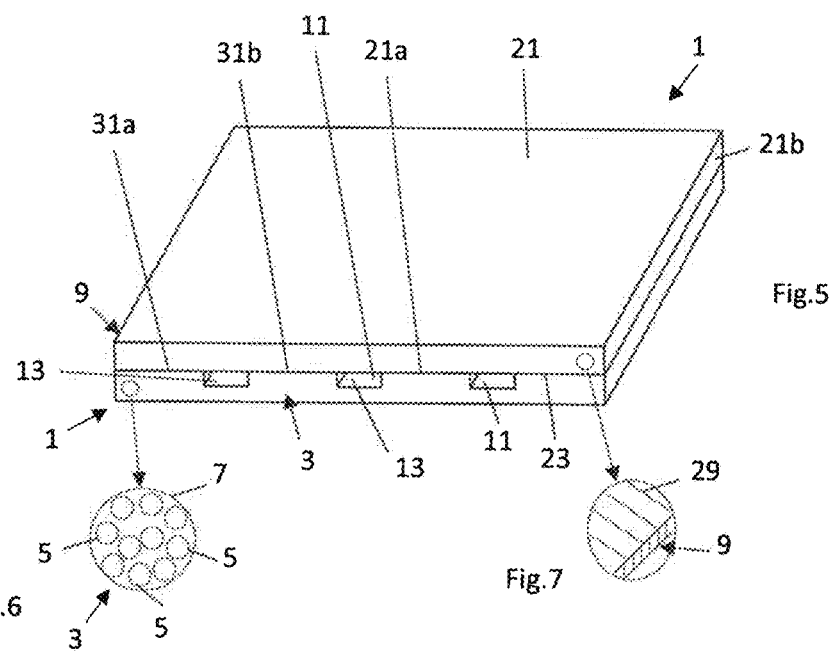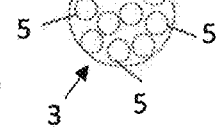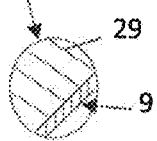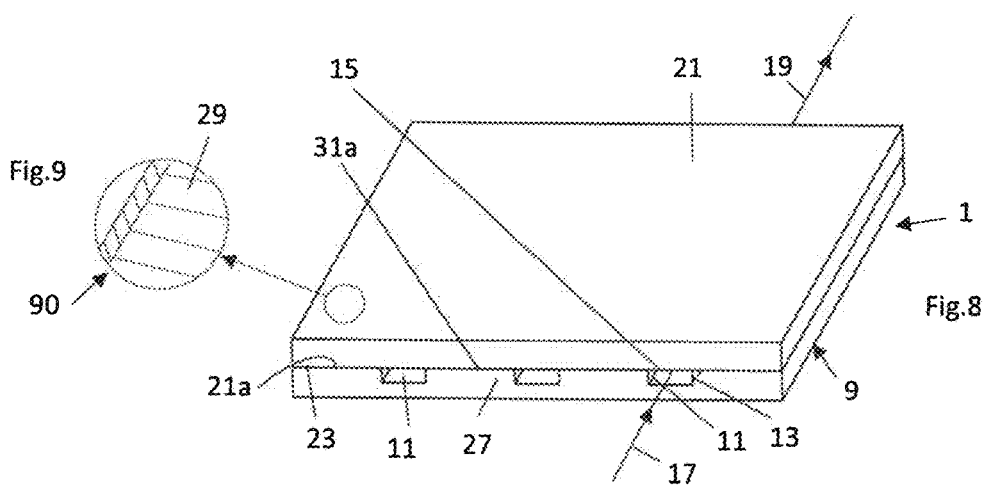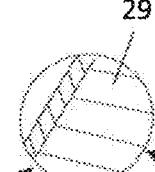

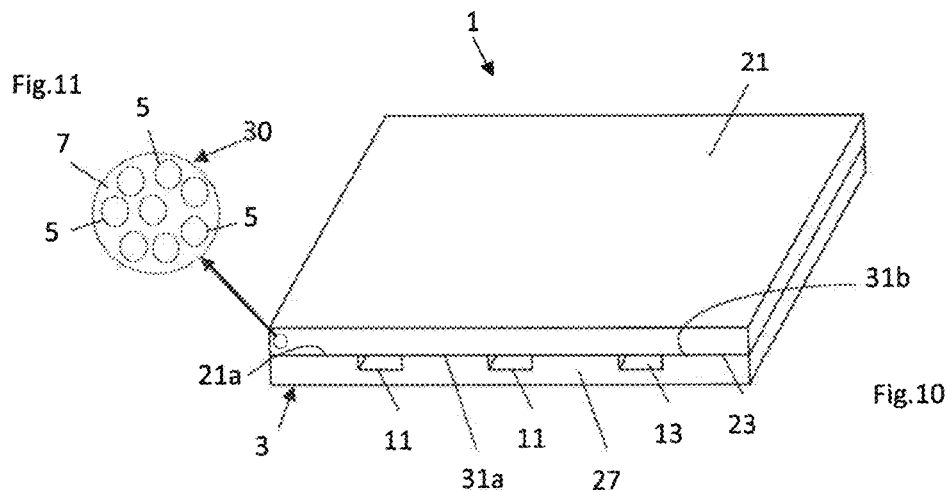
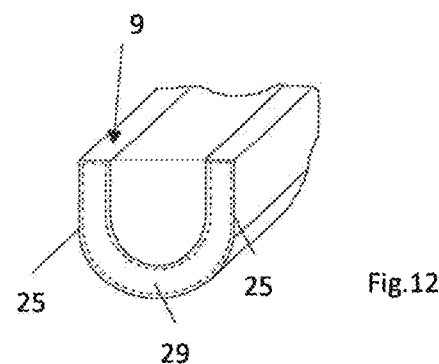
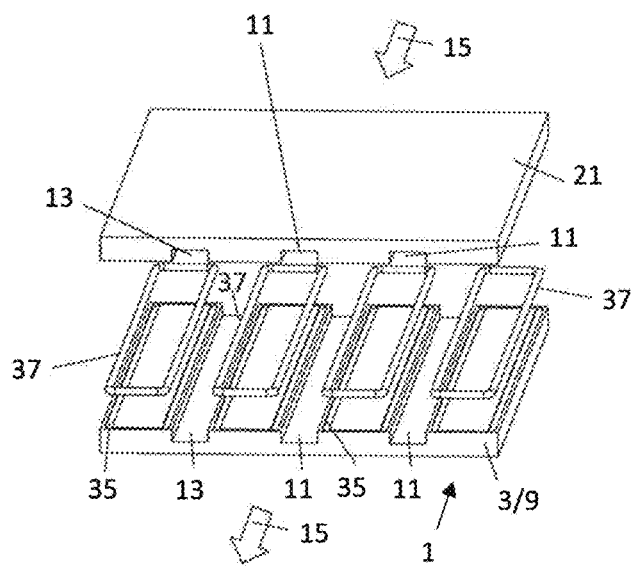

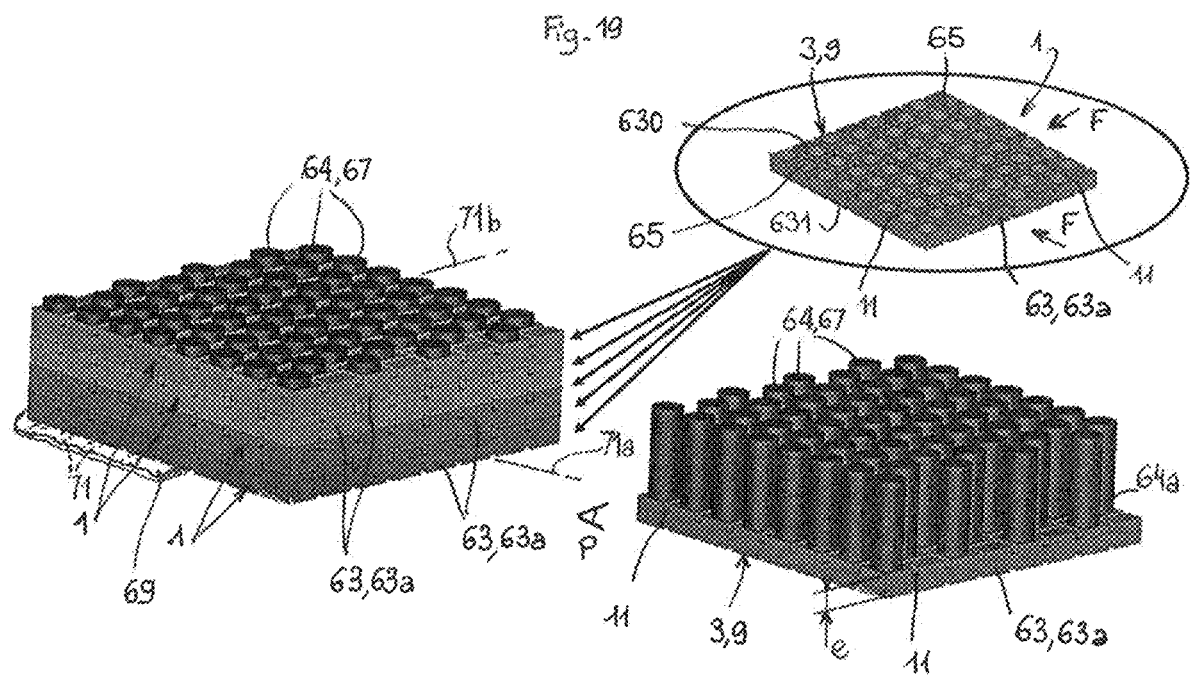
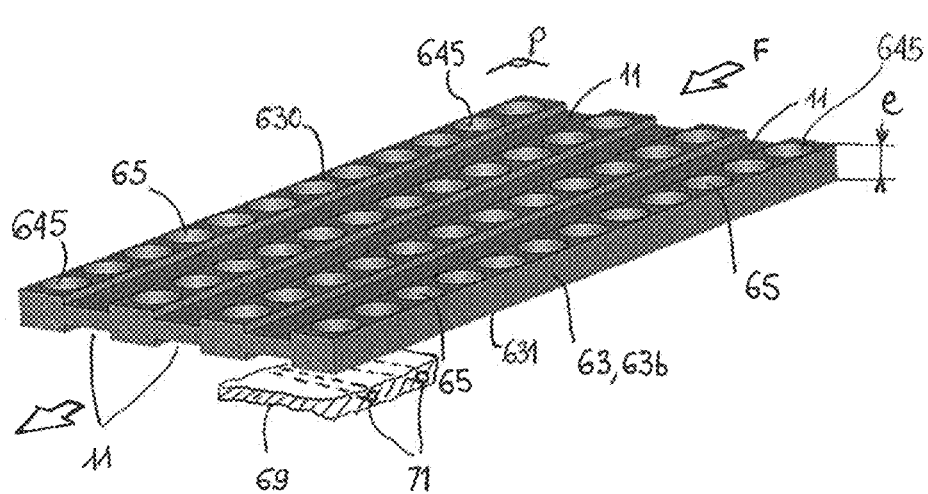

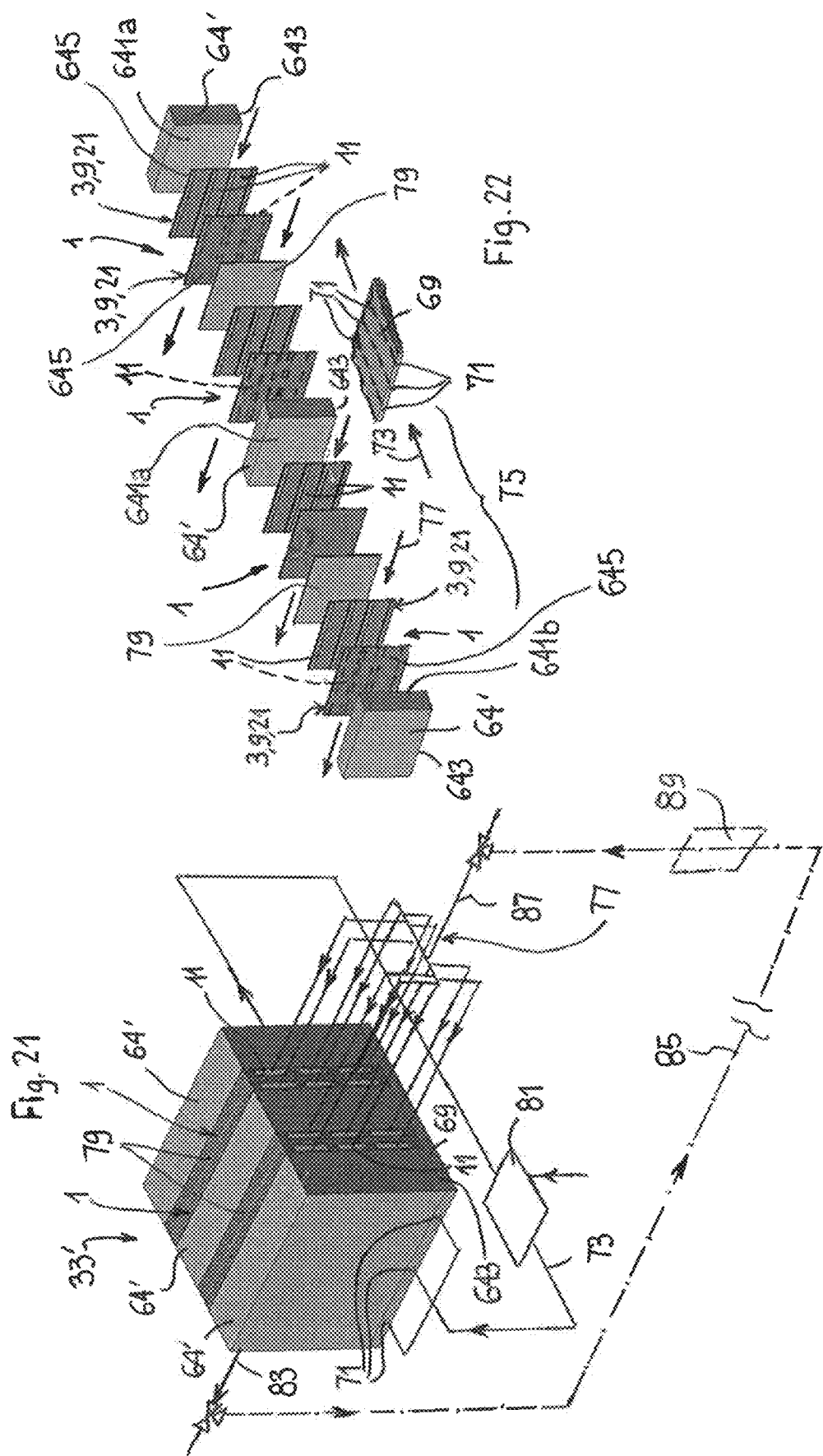

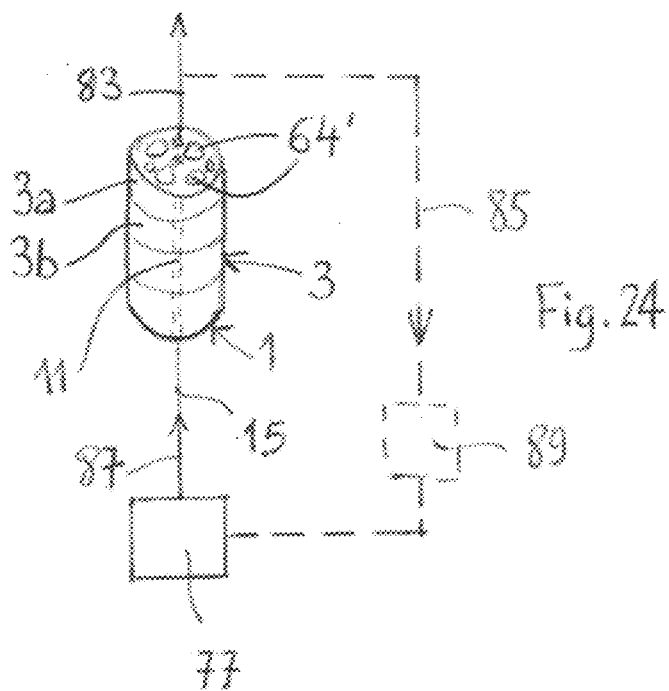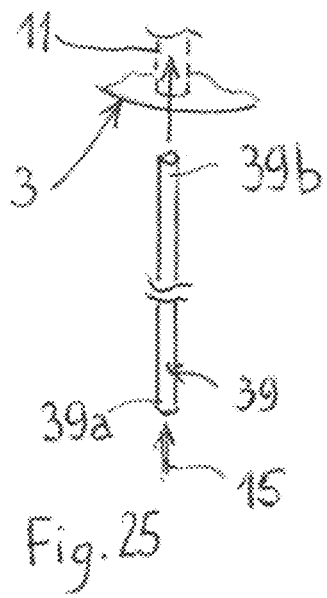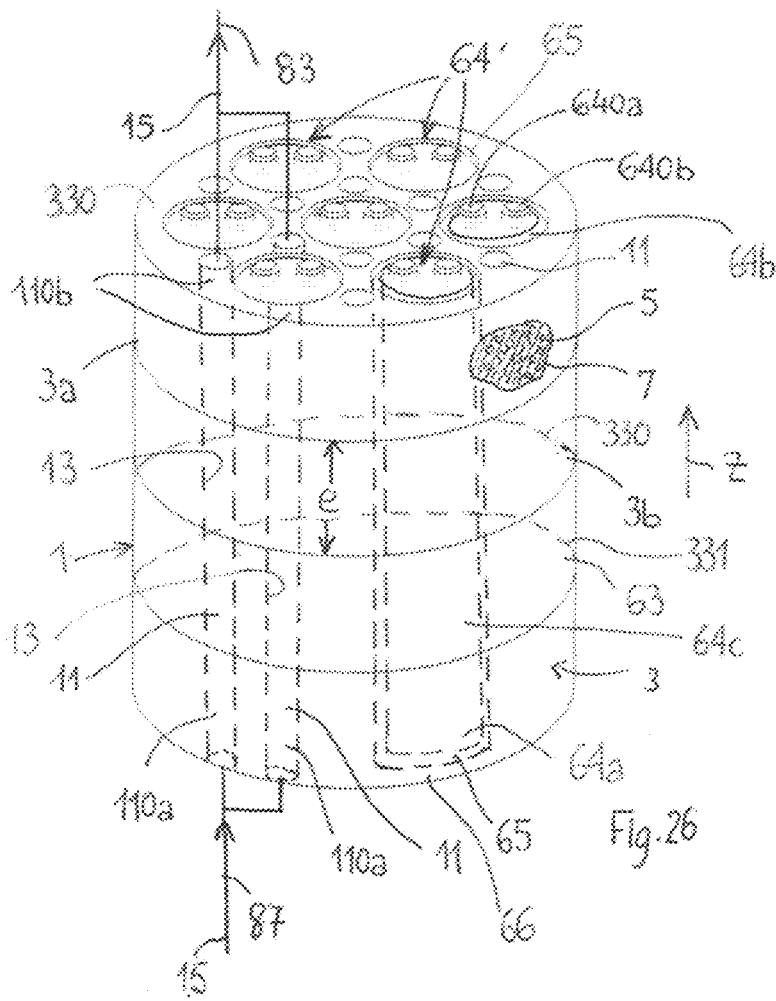

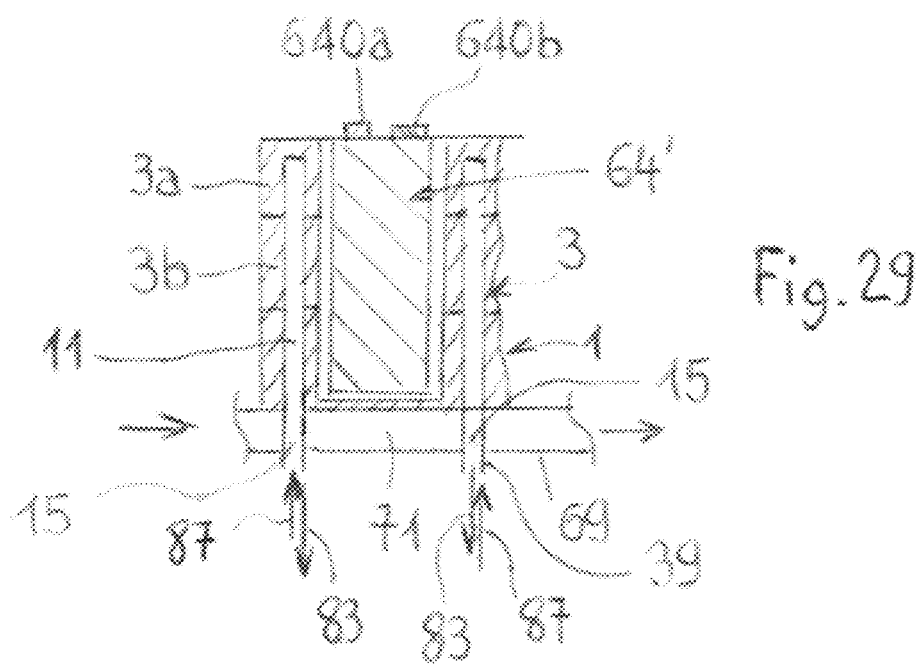

THERMAL MANAGEMENT STRUCTURE WITH INTEGRATED CHANNELS

CROSS-REFERENCE TO RELATED APPLICATIONS

This application is a continuation-in-part of International Application No. PCT/FR2019/052013 filed Sep. 2, 2019, which claims the benefit of priority to French Patent Application No. 1857878 filed Aug. 31, 2018, each of which is incorporated herein by reference in its entirety.

SUMMARY

The present invention concerns the field of thermal management. In particular, it concerns a thermal management device (also called a thermal barrier) designed to promote temperature management in an internal volume which this barrier surrounds or borders, on at least one side, and/or with respect to a temporary heat-producing element disposed therein.

This applies in particular, especially on a vehicle, to pipes, ducts or hoses in which fluids such as air or oil or a refrigerant (such as R1234 yf) circulate or electrical installations that heat, such as electric storage batteries, or engine parts whose temperature is to be managed:
- situations where a rapid rise in temperature must be encouraged, such as during a cold start,
- situations where it is necessary to promote cooling of the said engine part, such as in subsequent stabilized operation.

In the present text will have the following meaning:

PCM: a phase change material that changes its physical state (typically between liquid and solid) within a restricted temperature range, and absorbs up to a certain threshold a temperature change by storing the received energy; typically a temperature increase transmitted by a temperature rise of at least one cell, thermal insulator: a material with a thermal conductivity 0.5 W/mK, which conducts heat less well than a PCM when it is in a phase where it is the least thermally conductive, and thermally conductive: a material of thermal conductivity 1 W/mK.

As PCM, may be found:

"hot" PCM(s) with a melting temperature between more than 22° C. and 38° C., and preferably between more than 25° C. and 37° C. This type of PCM may be used during summer rolling and in particular when the outside temperatures are above 40° C. By melting, the PCM stores the calories coming from outside and creates a first thermal barrier;

"cold" PCM(s) with a melting temperature between 14° C. and less than 26° C., and preferably between 15° C. and less than 25° C. This type of PCM may be used during winter driving, especially when temperatures are negative. By crystallizing, PCMs release calories that heat up the battery pack;

PCM(s) used, in direct thermal contact with the cells, typically an PCM with a precise melting temperature, typically 35° C., as one can seek to create a plateau over a range of temperatures currently considered high for the cells, in order to avoid thermal propagation between cells (buffer effect). In a battery, it may be very useful to be able to regulate the operating temperature of the cells that heat up when they produce current and that favorably must remain within a precise temperature range whatever the external temperature conditions are, even when the cells are at standstill. In an air pipe connecting two hot zones of an internal combustion engine, for example, the temperature in the internal volume of the pipe may have to be regulated.

In an engine crankcase, after a cold start phase, evacuating, or rather transferring calories may be useful.

In this context, it is therefore conceivable that it may be necessary, depending on the situation:
- to isolate from the outside environment or to manage the temperature evolution of an interior volume and/or its contents,
- and/or to delay or on the contrary to favor the propagation of a thermal flow out of or towards this volume.

To circulate a fluid in a structure adapted to participate in this thermal management may then also be necessary.

Such structures exist which have fluid flow passages between two layers of material, between an inlet and an outlet for the fluid, so that a thermal insulation—if the layers are thermally insulating—or a thermal exchange—for example if the layers contain a PCM, the agreed name for a phase change material, PCM, with a change of state for example between liquid and solid—is achieved with respect to the fluid.

Thus, FR3015780 discloses the use of fluid channels in PCM for the circulation of a thermal transfer medium, especially liquid. The fluid channels are formed in a rigid block to hold them in place when the PCM changes to the liquid state.

This is a rather complex assembly to fabricate. In addition, there is no indication of how the shape of the PCM layers and the "rigid block" to hold the fluid channels in place may be achieved.

Thus, among the problems that we wanted to solve here is the one related to the efficient realization of the structures, or assemblies, adapted to participate in a thermal management of the environment.

A solution proposed here consists in a structure including at least one thermal management element comprising:
a composite body containing at least one phase change material (PCM) in a rigid structuring matrix, so that the composite body is self-supporting regardless of the phase of the phase change material contained, the composite body being shaped to locally present externally at least one said cavity (viz. hollow) that defines by itself a channel wall suitable for the circulation of a fluid, the composite body defining a tray(viz. flat plate) which has a thickness (e) and on at least one of whose faces the channels formed by the cavities extend, and
between the channels, passages are formed in the thickness (e) of the flat tray to receive external elements to be placed in thermal exchange with the fluid to be circulated in the channels.

In this way, the interest (in weight, fineness and ease of shaping) of the composite body is combined with the realization of trays with integrated fluid circulation channels.

For the same purpose, it is also proposed a set of said structures comprising several structures as above in which said channels are arranged back to back, on two faces of each tray opposite each other according to thickness (e), the trays being stacked, one resting on the other between the channels of a same said face, so that a said tray forms a cover for the adjacent tray, thus creating said channels with a closed section.

A modular assembly is then produced whose shape and dimensions can be easily adapted to the number and dimensions of the cells in the battery.

The thickness (e) is then defined parallel to the stacking direction of the trays or, if each tray is plane, perpendicular to the plane of each tray. This also applies to an assembly comprising:
- the above assembly, in which the passages pass through the trays, and
- as so-called external elements, cells of a vehicle electric battery arranged in the successive passages of the stacked trays.

The fact that this assembly may be such is also referred to:
- that the said cells are arranged in thermal exchange with the trays on the first sides of the cells, the channels being then connected to a first supply of fluid to be circulated in the said channels, and
- that there is further included a cooling plate arranged in thermal exchange with the cells on second sides thereof, the cooling plate having ducts which are connected to a second supply of a fluid to be circulated in said ducts, for a surface thermal exchange with the cells.

The thermal management of the cells will be further strengthened, under other conditions, since the cooling plate will a priori be PCM-free.

Is as well concerned, the assembly:
- in which the cells, which are cylindrical, will extend in the successive passages of the stacked trays up to a base of each cell, and
- where the cooling plate is arranged in thermal exchange with the cell bases. In the present solution, there are no fluid channels arranged in PCM (the channels are separated from the PCM by the material of the composite body). In fact, there is no longer any need for add-on structural elements to define the fluid channels themselves within a rigid intermediate structural element (which may also be dispensed with), nor is there any risk of altering the mechanical strength of the structure, which is self-supporting, if only because of the said cavities.

To all intents and purposes, it is confirmed that a phase-change material—or PCM—refers here to any material capable of changing its physical state, for example between solid and liquid or solid and gaseous, in a restricted temperature range between −50° C. and 50° C., or even between −60° C. and 150° C., taking into account the privileged applications which may occur in the field of vehicles (land, air, sea or river vehicles). Thermal transfer (or thermal transfer) may occur by using its Latent Heat (LC): the material can store or transfer energy by a simple change of state, while maintaining a substantially constant temperature, that of the change of state, In connection with the use of a rigid structuring matrix, it was sought to define solutions that satisfy the following problem: industrial mass production, reduced mass, easy and precise cutting for shaping at will, low cost, thermal performance (adapted thermal conductivity, especially in a "battery" environment), maintenance of the phase change material (PCM) in the matrix during the phase change of the material, possible use in a fluid(s) exchanger system, with capacity for the PCM to be not in contact with the fluid(s), in order to avoid dispersions when it is in liquid phase (or gaseous in the event that it is in one of its phases). The contact (interface) with the fluid(s) will then be ensured by the rigid structuring matrix, Taking this problem into account, it is first proposed that the composite structure should include an elastomer or fibers, thus in addition to at least one PCM (and a priori rather a material with several PCMs changing phases at different temperatures). With an elastomer, one will benefit from a high deformation capacity, while the fibers will be used for their lower density and their important capacity of impregnation of PCMs.

In the composite structure option including (at least) one elastomer, it is proposed that the elastomer be selected from the following compounds: NR, IR, NBR, XNBR, HNBR, ECO, EPDM, EPM, CM, CSM, ACSM, CR, ACM, EVA, EAM, ethylene-acrylic acid copolymers, butyl rubber, halogenated butyl rubber and isobutylene-p-methylstyrene para-bromo-methylstyrene, with the addition of at least one of the following modifying agents : carboxylic acid maleic anhydride-grafted 1,2-vinyl polybutadienes or epoxidized and/or hydroxylated polybutadienes, silanes, ethylene-acrylic acid copolymers, maleic anhydride-grafted ethylene-propylene copolymers. In this case, it will be a priori preferred that:
- the compactness should be between 60 and 100%.
- the conductivity of the composite body be between 0.5 and 3 W/m.K-1, preferably between 1 and 2 W/m.K-1, and
- the mass concentration in the composite body of the phase change material is between 40% and 70%, preferably between 50% and 60%. In the option composite structure including fibers, it is proposed that (at least) a graphite felt be used to take into account the above-mentioned problem.

In this case, it is preferable that the conductivity in the direction of the graphite fibres of the composite body be between 10 and 50 W/m.K-1, preferably between 20 and 40 W/m.K-1, and that the mass concentration in the composite body of the phase change material be between 20% and 95%, and preferably between 30% and 90%.

It should also be noted that the above-mentioned structures will be very useful for making protective housings or lining blocks. Thus, a housing comprising:
- several structures as above which will define the side walls of the case, and
- blocks of angles each interposed between two said successive structures, which will bring them together and which will be crossed by communication passages between said cavities of the successive structures.

Another case: a housing comprising side walls and several structures as mentioned above which will double these side walls.

BRIEF DESCRIPTION OF THE DRAWINGS

If necessary, the invention will be better understood and other details, characteristics and advantages of the invention may appear when reading the following description made as a non-exhaustive example with reference to the appended drawings.

In these drawings:

FIG. 1 schematizes (in exploded view) structures conforming to those of the invention between and around a battery cell, to ensure peripheral thermal management;

FIGS. 2-5, 8, 10 and 12 show various examples of such structures conforming to those of the invention;

FIGS. 6, 7 schematize two local enlargements of the realization of FIG. 5; and FIGS. 9 and 11 schematize two local enlargements of the realizations of FIGS. 8 and 10, respectively, it being noted that FIGS. 4 to 11 show operational structures, with joined elements, while FIGS. 1 and 13 to 17 are exploded views;

FIG. 12 shows a composite body or so-called pocket, of curved shape; here with a roughly U- or C-shaped cross-section;

FIGS. 13, 14 show two solutions respectively with joints and additional tubes with liquid circulation, these two aspects may be dissociated;

FIGS. 15, 16 schematize two solutions with intermediate fluid circulation sheath;

FIG. 17 shows a solution with an intermediate plate for lateral closure of fluid circulation channels;

FIGS. 21, 22 show a combined and exploded thermal management assembly of prismatic battery cells with dual fluid flow, surface and core respectively, FIG. 23 schematizes the solution shown in FIG. 22, with additional electrical insulation sheets, FIGS. 24 to 28 refer to another embodiment in relation to cylindrical cells and cylindrical trays; a pullout in FIG. 26 shows the inner composition of the PCM and some details about the passages, channels and cells (dotted lines)

In FIG. 29 is illustrated an alternative embodiment in which the fluid inlet 87 and the fluid outlet 83 of the cavities 11 (including if the cavities are individually internally lined with a sheath 39) are located at a same end of the sheathes and are common on said sheathes, so that the sheaths are individually adapted so that the fluid flows back and forth in each sheath; see the arrows in FIG. 29.

DETAILED DESCRIPTION

Figure 14:
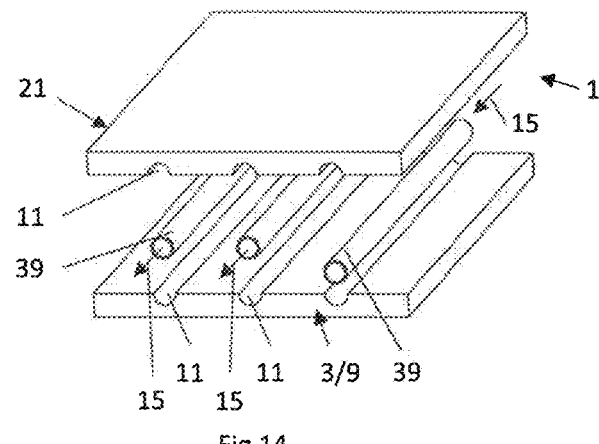

A goal of the solution proposed here is thus the efficient realization of structures with high thermal inertia (related to the presence of PCM) and/or thermal insulation (related to the presence of PIV type thermal insulation) for environmental thermal management purposes, in particular for a battery of electric accumulators (also called "cells" in the present description). In fact, structure 1 proposed for this purpose includes, as illustrated:

a composite body 3 containing at least one phase-change material 5 (PCM) dispersed in a rigid structuring matrix 7, such that the composite body is self-supporting regardless of the phase of the phase-change material contained, and/or a plastic or metallic, thermally conductive, gas-tight and under partial internal vacuum (PIV type) pouch 9, having a shape maintained by the internal vacuum. Each pouch 9 (or 90 below) may wrap (i.e. contain) PCM 5.

The composite body 3 and/or the pocket 9 are shaped to present locally at least one so-called cavity (viz.hollow) 11 which defines by itself a channel wall 13 which may be suitable, or even intended, for the circulation of a fluid 15, it being then assumed that the channel created is then connected to a supply 17 and a recovery 19 of this fluid, which may be liquid or gaseous, see below:

FIG. 4 for an example of circulation of fluid 15 in a closed circuit, with passage through an exchanger 20 where fluid 15 could either be charged with/either discharge calories or frigories, and FIG. 8, for an example of fluid flow 15 in an open circuit.

Fluid 15 may be either a thermal transfer medium or a refrigerant. It may be a liquid.

If, as shown in FIG. 2-3, structure 1 with the above-mentioned characteristics is limited to a composite body 3 or pocket 9, the wall 13 of the channel (the cavity 11) can be closed off laterally, and the structure completed by at least one cover 21:

which will locally complete (itself) the wall 13, via a part of its surface 21a placed against the composite body 3 or pocket 9, and which will be attached to this composite body or pocket in a fluid-tight manner.

In the figures, the elements marked as composite body 3 or pocket 9 or lid 21 may be interchanged.

Thus, in an assembly or structure 1 provided with a cover 21, at least one of the elements may be presented as a plate, without a so-called cavity, as shown in FIGS. 5, 8, 10.

For the connection with this cover, it is proposed that each composite body 3 or pocket 9 has lateral flanges 23 for a support of cover 21. Lid 21 may then be welded to the composite body or pocket at the location of the flanges 23. In this way, welding on the edges of the parts may be avoided, as shown in FIG. 4.5.

From the above, it is clear that any shape that serves as a cover for the fluid channel 15 is suitable.

However, for the construction of the covers, it may be preferable, as shown in FIGS. 9,11, that each cover 21 should include at least one cover:

another self-supporting composite body 30 regardless of the phase of the PCM contained, and/or another pocket 90, PIV, plastic or metal, therefore gas-tight and under partial internal vacuum, whose shape will be maintained by the internal vacuum.

As previously, this other composite body 30 and/or other pocket 90 will then be shaped to locally complete and laterally close the wall 13 of the above-mentioned canal, viz. each cavity 11.

As already mentioned, this will be an interesting answer to the current difficulties in the industrial production of a structure allowing both fluid circulation and packaging of either a vacuum or PCM.

In order to help achieve both a certain intrinsic stiffness and the definition of the desired fluid channels, it is further proposed that each composite body 3.30 or so-called pocket 9.90 should have, as illustrated:

a curved shape, with angles 25 which may be rounded (see FIG. 12); and/or, a crenellated shape in which at least some of the crenellations 27 define several so-called cavities 11 (see FIGS. 3,10 for example).

These slots and corners will also be well exploited by providing that, in order to laterally close each channel (i.e. each cavity 11), the cover 21 and the self-supporting composite body 3 or pocket 9:

have watertight welds between them, at the location of respective sections, such as 31a, 31b, of walls bordering the channels, and are in support two by two, including at the place of the said respective sections of walls, such as 31a, 31b, thus interposed between two consecutive channels, or located on either side of the laterally external channels.

In pockets 9 or 90, a so-called thermally insulating material (see above) may usefully be placed 29, which may even reinforce the intrinsic strength of the vacuum pockets.

Concerning the choice in the realization of composite bodies 3,30, the following recommendations may be followed, in particular to meet a need for temperature maintenance of cells or housings of a battery 33 of electric or hybrid vehicles; cf. FIG. 1 where each structure 1 comprises in the example two parts 3,21 each directly integrating a series of channels (cavity 11 with walls 13), here parallel, of fluid circulation 15, which arrives and leaves via an external circuit.

Indeed, lithium-ion cells in particular are strongly impacted by the temperature parameter. If this parameter is not taken into account, it may have serious consequences on the lifetime of the battery cells, on their performance (capacity and delivered power), on their stability and on the safety of use.

First of all, even if the liquid-gas and inverse change of state of PCMs is interesting in terms of the amount of energy involved, the preferred change of state in the targeted applications may be solid-liquid and inverse. Then, to stay with the example of lithium-ion cells, the temperature range in which they must be maintained to operate optimally is between 25 and 35° C. However, in addition to the materials used for the elements involved in the thermal management and the layering of these elements in layers that may combine PCM and thermal insulation (see for example WO2017153691), it may be necessary to provide for a fluid circulation within this architecture, typically between two layers of materials; see channel 55 in this document.

To be able to circulate a fluid 15, with channels connected for example to an external air circuit, between the inlet/supply 17 and the outlet/recovery 19, will then be required, in a structure such as that 1 presented here.

In addition to achieving this with the above solution, we also wanted to define a high-performance composite body, as mentioned above, since it is the very nature of this body that will ensure the criteria of thermal performance, self-supporting and ease of shaping or cutting expected.

Therefore, two solutions are proposed, respectively based on elastomer or fibers, each with several PCMs changing phases at different temperatures. It should be noted that the phase change materials used in the formulation will then be favorably formulated to include them in matrices with a mass quantity of PCM in the formulation typically between 30 and 95%. The formulations will preferably use microencapsulated or pure materials whose phase transitions may be included, for battery applications, between −10 and 110° C. (depending in particular on the electrochemistry, lithium-ion or not).

In the case of lithium-ion applications, microencapsulated PCMs with a mass percentage on formulated product of 35 to 45% may be used. These PCMs will be favorably included in a silicone matrix containing, in particular, flame-retardant and thermally conductive fillers.

In the first of the two above-mentioned solutions, matrix 7 includes (at least) an elastomer, which allows the body 3 to be adapted to situations that may require mechanical stressing or the monitoring of complex shapes (elastic aspect of the elastomer), with small masses.

In the second solution, the matrix 7 comprises fibers.

In terms of implementation, several structures 1 may be installed between two adjacent cells and/or on different faces and on the periphery of the battery compartment in order to wrap it.

Starting from the surface of the battery compartment, four layers of phase-change material (several PCMs) may be provided, between which fluid 15 (e.g. air) may be circulated. On the outside of the PCM cells, the vacuum insulation is installed, typically one or more pockets 9 or 90. A thermally conductive peripheral envelope will allow the mechanical strength and protection of the system as a whole.

Note that the above two solutions ensure that the PCM is not in direct contact with the fluid and that there is no leakage of PCM in the fluid state. In general, a composite body solution as above will be able to work dynamically: on an electric or hybrid vehicle, typically at a time of high demand, such as for example during a start under electric drive in winter (outside temperature of 3-4° C. for example) we will indeed be able to circulate air (coming from the outside) in the cavities which will allow this air to heat the PCM, having in passing recovered thermal energy on the cells of the battery, the air may then be redirected to the outside environment. During its journey, the air will have both warmed the PCM(s) and evacuated excess heat from the battery cells. Another hypothesis: in winter, during cell operation, air cooled by an air conditioning circuit is projected towards the cells. This blown air then passes in channels 11.

Now, concerning the fabrication of the 3.30 composite bodies, it should be noted that they may be presented as plates comprising compressed fibrous graphite as a structuring matrix in which the PCM, which may be, or comprise, kerosene (viz. paraffin), is impregnated.

Graphite felts can be obtained by exfoliation. If there is a cover, it will be thermally conductive (e.g. plastic foil). The impregnated matrix will not release PCM if it is not stressed. And to obtain a composite body with an integrated channel wall, the raw composite body may simply be molded or machined. The vacuum bag solution may be obtained by folding.

FIG. 13, one solution proposes that structure 1, which comprises composite body 3 and lid 21 with at least one other so-called composite body 30, additionally includes grooves 35 in composite body 3 and/or lid 21. The grooves 35 receive seals 37 for fluid tightness between said bodies, bordering the cavities 11. In the example, the fluid 15 is in direct contact with the channel walls 13.

The alternative solution in FIG. 14 proposes that structure 1 includes tubes 39 for the circulation of a liquid, as fluid 15. The tubes 39 are individually received in the opposing cavities 11. They are made of a material that promotes thermal exchange with the interior of the elements 3,9,21 so that this takes place as the fluid passes through.

Figure 15:
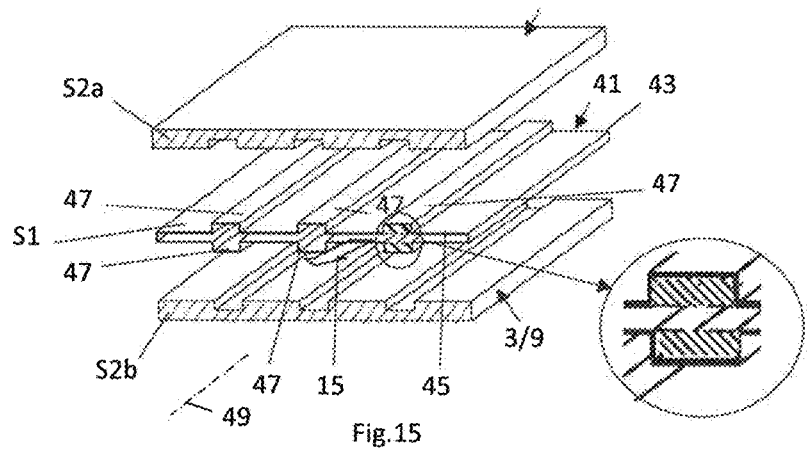
Figure 16:
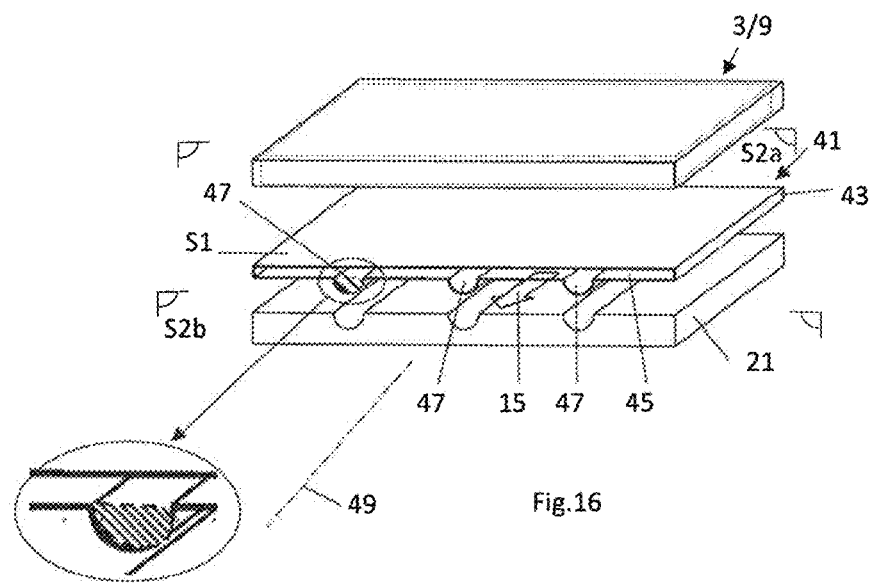

The alternative solution in FIGS. 15,16 proposes that structure 1 include a sheath 41 for circulation of said fluid 15. Sheath 41 has an inlet 43 and an outlet 45 for the fluid. It incorporates several elongated depressions (viz recesses) 47 protruding outwards. These depressions 47 are received (wedged) in the opposing cavities 11. The sleeve 41 is fixed directly or not (e.g. by gluing together panels 21 and 3 (or 9) on either side of the sleeve) between lid 21 and the composite body or said pocket. Transversally to a general direction 49 of elongation of the depressions 47, and thus of the cavities 11:

the sheath 41 occupies a closed section 51 (see section defined by the bold line in FIGS. 15,16) of between 30 and 100% of the cumulative section of said lid 21 and composite body or pocket (see hatched sections S2*a* and S2*b* in FIGS. 15,16), and in this closed section 51, the depressions 47 occupy a minor section, preferably between 5 and 20% of the said total section 51 of the sheath (see hatching in the sheath FIG. 15). The sheath is made of a material that promotes thermal exchange with the interior of the elements 3,9,21 so that this takes place when the fluid passes in and circulates throughout the sheath (section 51).

Elongated depressions 47 may be on both large surfaces of the sheath if both panels or structures 3 or 9 and 21 are provided with cavities 11 (FIG. 15), or on one surface only if only one of the structures 3 or 9 and 21 is provided with cavities 11 (FIG. 16).

Figure 17:
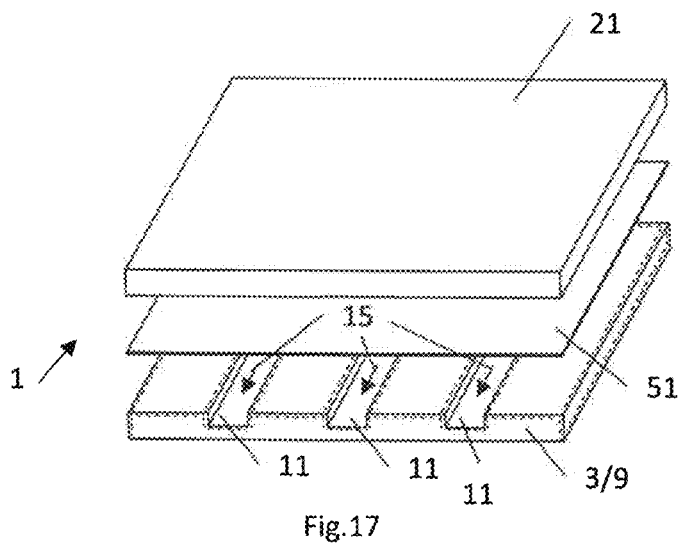

The advantage of a sheath compared to a solution with independent tubes or plate 51, as shown in FIG. 14 or 17, may be a security seal; it is also no longer necessary for cover 21 to be fixed together with the composite body (3) or pocket (9) in a fluid-tight manner. In the sheath solution, a grouped arrangement, self-centering and a fluid passage cross section 15 not limited to the hollow areas may be used (the entire cross section S1 is concerned, not only that of the depressions 47).

The alternative solution in FIG. 17 proposes that structure 1 should include a plate 51 for lateral closure of the cavities 11 and thus of the channel walls 13. The plate 51, which is flat and solid, is fluid-tightly interposed between the at least one cover 21 and the composite body 3 (or the said pocket 9). If both lid 21 and composite body 3 (or said pocket 9) had cavities 11, plate 51 could allow two different fluids 15 to flow on either side of the plate into the respective cavities 11. If there are tubes 39 for circulation of a liquid, as said fluid 15, the tubes 39 are individually received in the opposing cavities 11. They are made of a material that promotes thermal exchange with the inside of the elements 3,9,21 so that this takes place when the fluid passes in.

Figure 18:
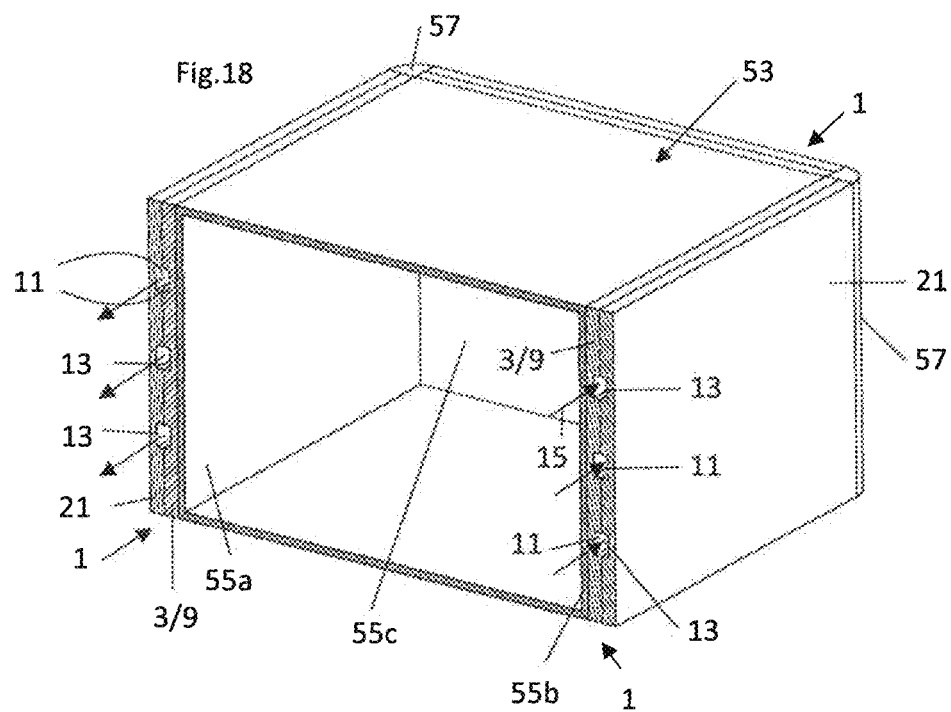
FIG. 18 shows a housing (viz. a casing) with two side panels incorporating fluid flow channels, FIG. 19 (in three parts: top, right and left) and FIG. 20 schematize a solution with stacked trays, passages for cells and air channels.

FIG. 18 shows a solution with a box 53 in which at least some of the side walls, three adjacent 55a, 55b, 55c in the example, are doubled, here externally, by side panels 1 integrating (walls of) channels 13 for fluid circulation and blocks 57 of fluid connection angles between two channels of adjacent panels. The arrows mark the inlets and outlets of fluid 15, respectively from and to a source, as shown in FIG. 1. In the examples in FIGS. 1 and 18, the corner blocks 57 are arranged at the corners, between two adjacent side panels, or structures, 1 arranged to form an angle between them and which the side walls 57a, 57b of each corner block 57 allow to join. For the circulation of the fluid, each corner block 57 integrates ducts 59 to be connected individually to the channels 11 facing it. Each duct 59 is curved so that the fluid flows through the corresponding corner. Preferably, each corner block 57 should be made of thermal-insulating material (e.g. PU foam).

In an application such as a battery 33, where thermal management may involve both part of a whole (one cell of the battery) and the whole (all cells of the battery), cell 33.53 of the above solutions shown in conjunction with FIGS. 1 and 18 may involve both one cell and all of the cells. In the latter case, the side panels, or structures, 1 would surround all the cells, which would not prevent each cell from being surrounded by another group of side panels, or structures, 1 supplied with fluid, which may or may not be the same as the aforementioned 15.

It should also be noted that cover 21 or the other element of a panel, or structure, 1 to body 3 or pocket 9 may include a thermal insulating material that is not under partial internal vacuum (PU foam, for example), and therefore not PIV (see FIG. 1).

FIGS. 19,20 also show two variants of a structure 1 conforming to the invention which comprises a series of said composite bodies 3 and/or pockets 9 each defining a tray 63 (viz. flat plate), in two versions 63a (FIG. 19) or 63b (FIG. 20).

The objective is to produce an assembly allowing cooling, for example by forced air, of vehicle battery cells 64, by favouring their thermal management in their optimal operating temperature range, avoiding dead zones and non-homogeneous temperatures.

To this end, each tray 63 has a thickness (e) and on at least one of the faces 630, channels formed by the aforementioned cavities 11. These channels extend along the entire length of the face concerned and open individually on two opposite sides of the tray.

In addition, between the channels 11, passages 65 are formed in the thickness (e) of the tray 63 to receive external elements 67 (in this case the cells 64) to be placed in thermal exchange with the fluid 15 to be circulated in the channels 11. Thus, the external elements 64, 67 to be stored are stored transversely to the plane P of each tray and the flow of fluid 15 circulates in this plane, over the largest possible surface.

Each tray may thus be defined by a molded PCM element integrating passages 65 and channels 11, which makes assembly easy (left view, FIG. 19), integration of the fluid channels (top view, FIG. 19) and easy selection of the PCM phase change close to the operating temperature of the cells.

Typically, if the cells 64 are presented as a kind of "cylindrical stack" as illustrated, each tubular in shape, the trays will be favorably stacked, parallel and leaning against each other between channels 11 on the same side, so that one said tray 63 forms a cover for the adjacent tray 63, thus creating said channels with a closed section.

In order to increase thermal exchange, it is recommended that tray 63 include channels 11 arranged back to back, on the two opposite sides 630, 631 according to the thickness (e) of each tray.

And for the positioning and holding of cells 64, the passages 65 pass through the entire thickness (e) of the trays 63 and the cells 64 are individually arranged in the successive passages 65 of these stacked trays 63 through which they pass. A lower support plate 69 can support the stack and the cells 64. It may be a cooling plate with other channels 71 for the circulation of coolant, in thermal exchange with each cell 64, at its base 64a; right view FIG. 19 and FIG. 20.

In the version of FIG. 20, channels 11 are all parallel to each other. In the version of FIG. 19, channels 11 extend in several directions (71a, 71b) so as to cross each other and are staggered in one of the directions (viz. in quincunx), that of 71b in the example (top view of FIG. 19).

In connection with a solution shown in FIGS. 19 to 22, another aspect of the invention aims at ensuring a particularly fine and efficient thermal management of a vehicle electric battery, such as that 33 of FIG. 1, or that of FIG. 19 with its cylindrical cells, or that 33' of FIGS. 21, 22 with its prismatic cells (here rectangular) 64', aligned in at least one direction to form a rectangular parallelepiped of square or rectangular section.

If WO2017153691 raises the subject, the solution could be improved. Thus it is first proposed here as an improved solution, as FIGS. 21, 22, 27, 28, an assembly including :
several structures 1 as already presented, with all or part of their characteristics, and thus individually with composite body 3 or pocket 9 or lid 21,
several electric battery cells 64' of a vehicle, and
a said cooling plate 69 arranged in thermal exchange with the cells 64' on said second sides 643 of the latter.

The cooling plate 69 is thermally conductive and has ducts (here internal) 71 which are connected to a second supply 73 of a fluid to be circulated in said ducts 71, for a surface thermal exchange with the cells 64'. On this subject, it should be noted that this is also provided for in the solution of FIGS. 19,20 and FIGS. 24-28. This thermal exchange is called "surface thermal exchange" because the cooling plate 69 is against an outer boundary face of the battery. It is not between two cells, as is the housing with structure 1. In the design selected, each cell and the battery as a whole is supported by cooling plate 69.

In addition, in this solution, between two first opposite sides (respectively 641*a* and 641*b*, FIG. 22) of at least two successive cells 64', there is a space 75 where at least one structure (1; 3, 9, 21) is interposed, in thermal exchange with the cells, with its channel-forming cavities 11 that are connected to a first supply 77 of a fluid to be circulated in said channels 11, in the heart of the space 75, between the cells 64'. The first and second fluids, respectively of the supplies 77, 73, do not cross each other; their circulations are independent; hence the possibility of two different fluids; see FIGS. 21 and 24-28.

If FIG. 22 clearly shows space 75, because of the exploded view, each space is, once the assembly is completed, occupied by at least one structure 1. The structures (1; 3, 9, 21) and cells 64' are placed one against the other, in a stacking direction (here horizontal). In the selected mode of construction, each space 75 is occupied, from one cell to the next, by two structures 1, a thermal insulating block 79, then two more structures 1.

The second fluid supply 73 will usefully be that of a liquid, such as water, because the sealing and connections are simpler to ensure than for the first supply 77. In addition, this will be more effective when there is "surface thermal exchange". This second fluid supply 73 will also be usefully connected in a closed (looped) circuit, via a pump 81; FIG. 21.

After exiting (in 83 FIG. 21 or FIGS. 24-26) from the said assembly, the conduits of the said first supply 77 may, via a conduit 85 and adapted valves, be looped to the inlet 87, to ensure a recycling of the fluid, even if this means passing it in a thermal exchanger 89, in particular to blow at certain times into the channels 11 a fluid cold enough to make the PCMs return to the solid state, in a hypothesis of PCMs with two phases: solid and liquid.

Figure 27:
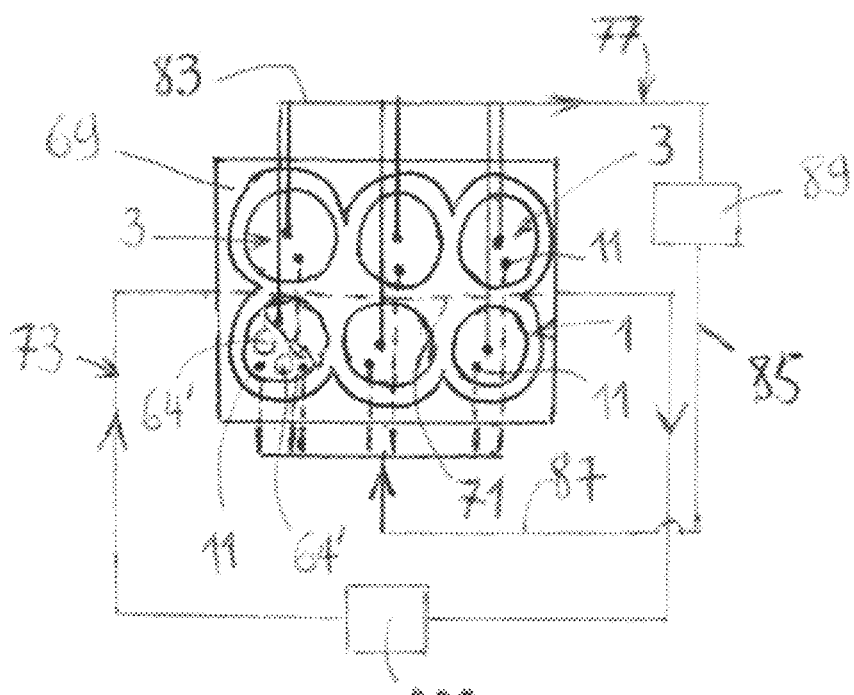
FIG. 27 is a view from above and FIG. 28 a side view; a pullout in FIG. 27 shows some channels and cells.
Figure 28:
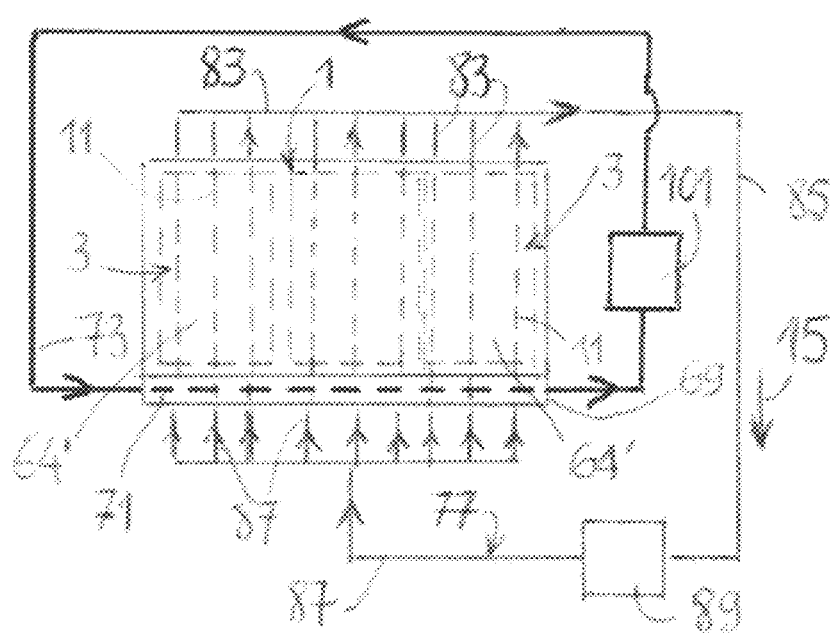

Even if not represented in FIG. 21, a thermal exchanger referenced 101 in FIGS. 27-28 may be disposed on such a closed circuit conduit 85, to adapt the temperature of the fluid supplied to the ducts 71 by the so-called second fluid supply 73.

The second fluid supply 73 will usefully use a gaseous fluid, such as air. It is preferable that the circulation of this fluid in the assembly be forced (fan or other).

Once again, for a quality of thermal exchange and a well-considered optimization of the thermal management provided by these fluid circulations, in connection with the PCMs present, it is recommended that each composite body (3) or pocket (9) presents, in front of the cells 64' (but this may also apply for example to the cells 64 of the previous solution), a solid, continuous surface 645 for non-discrete thermal exchanges with the cells. It will have been understood that, on the contrary, a discrete contact is like separate zones without a continuum.

Thus, in the previous solution, the surfaces 645 were formed by solid cylindrical faces. In the solution of FIGS. 21,22, surfaces 645 are flat, as are the walls 641*a* and 641*b* of the cells opposite. Thus, one may foresee that in front of one of said cells (64 or 64' for example) each composite body (3) or pocket (9) is applied in surface contact against the cell, without ventilated (forced) circulation of fluid between them.

Crossing the flows of the first and second fluids (always without mixing them) could further improve the efficiency of thermal exchanges.

Moreover, to counter the thermal transfers of a so-called 64' cell, it is proposed in the solution for prismatic cells (FIGS. 21, 22), to interpose a thermal insulating block 79 between two composite bodies (3) or pockets (9) themselves thus interposed between two so-called 64' cells.

Figure 23:
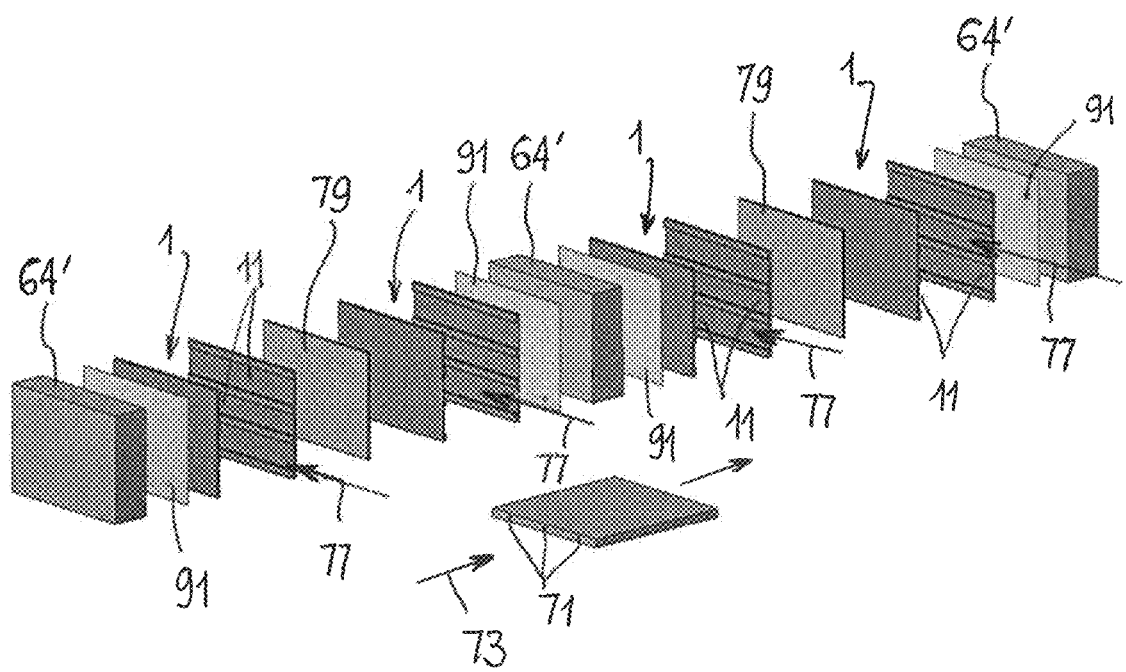

In the solution in FIG. 23, which reproduces the characteristics of the previous solution (FIGS. 21,22), electrical insulation sheets 91 were added, each interposed between one structure 1 and one cell 64'.

The purpose of the electrical insulation sheets 91 is to avoid short circuits in the event that the PCM of the composite bodies (3) or pockets (9) is electrically conductive. It is not obligatory to install this component, depending on the characteristics of the PCM but also on the desired effect: electrical insulation desired or not.

If the electrical insulation sheets 91 are provided, it will be advantageous for the effectiveness of the electrical insulation that the contact surfaces between the elements 1, 91, 64' are flat and continuous; hence the advice of flat surfaces on the two opposite sides of the electrical insulation sheets 91 and on the side of structure 1 (composite body 3 or pocket 9) facing the adjacent electrical insulation sheet 91; see FIG. 23.

In the additional embodiment of FIG. 24 is one more time illustrated an assembly comprising electric cells 64' of an electric battery, a fluid inlet 87, a fluid outlet 83, and one of a plurality of composite bodies 3.

The fluid supply (called first supply) 77 may comprise a fan or a compressor or a pump, and a buffer tank.

As in the solution of FIG. 21, the fluid outlet 83 may be connected to the outside environment (atmospheric pressure), or include, as previously explained, a closed-loop recycling circuit 85 (see the dotted line in FIG. 24) for recycling at least a part of the fluid 15 from the outlets of tubes 11 to the inlets thereof.

In conformity with the previous embodiments, each structure comprises at least one thermal management element 1 comprising a composite body 3 containing at least one PCM 5 disposed in a rigid structuring matrix 7, such that the composite body is self-supporting regardless of the phase of the PCM contained.

The, or each, composite body 3 is shaped to locally present externally (means in fluid connection with outside) cavities 11 which each defines by itself a wall 13 of a channel suitable for circulating a fluid.

The, or each, composite body 3 defines a tray (see for example FIG. 26) which has a thickness (e) and opposite faces on at least one of which extend the channels 11: (at least some of) the channels 11 open on the opposite faces 330, 331 of the tray they pass through.

Between the channels, passages 65 are formed in the thickness (e) of the tray to receive external elements 64' to be placed in thermal exchange with the fluid 15 to be circulated in the channels 11.

Thus, the composite bodies 3 are individually shaped into layers, such as 3*a*, 3*b*; five layers for example.

Each layer, such as 3*a*, 3*b*, may be defined by one of said composite bodies 3. As previously, the composite bodies individually are molded composite bodies, preferably.

The layers or trays may be stacked, successively one on top of the other. They may be so arranged, along the same direction Z as the cells 64' from their respective bases 64*a* (bottoms) to their tops 64*b* where the anode 640*a* and cathode 640*b* are located.

Each cell 64' may be cylindrical and elongated from bottom to top.

The layers, such as 3a, 3b:
are arranged face to face, so as to form a unitary block.
individually have passages 65 therethrough in which the electric cells 64' are respectively arranged, one per passage, and,
individually further have channels 11 therethrough.

Superposing the layers, such as 3a, 3b is a solution, as illustrated. Each passage 65 preferably has a closed bottom 66.

At the opposite, at the top, the anode 640a and cathode 640b are accessible from outside the corresponding composite body 3, to be electrically connected.

The channels 11 are suitable to circulate a fluid 15 therein.

The channels 11 have respective fluid inlets 110a commonly connected to the (external) fluid inlet 87 and respective fluid outlets 110b commonly connected to the (external) fluid outlet 83.

The PCM 5 is in thermal exchange with the electric cells 64' arranged in the passages 65 and with the fluid 15 which circulates in the channels 11, in accordance with the vehicle mode of operation.

Fluid 15 may be a gas or liquid, such as air or an water-based liquid (means more than 50 wt % of water).

The layers, such as 3a, 3b, individually have a thickness e according to the Z direction.

Preferably, the passages 65 and the channels 11 are arranged in a common direction.

Preferably, said layers are arranged face to face according to the Z direction, and both the passages 65 and the channels 11 pass through the layers transverse to said Z direction (vertically in the example).

If so arranged, parallel to the passages 65, the channels, or cavities, 11 will open each on the opposite faces 330, 331.

Two by two, adjacent layers, such as 3a, 3b, are applied one against the other, or bordered by seals for preventing fluid 15 from leaking, especially if liquid.

Individually arranging a sheath 39 (FIG. 25) within said cavities channels, or cavities, 11 will allow fluid 15 to circulate in the thermal management element 1. Each sheath 39 has an inlet 39a and an outlet 39b for the fluid. Each sheath 39 may be a tube.

To get an electric battery pack, a plurality of composite bodies 3 are grouped, side to side (FIGS. 27-28), each containing the cells 64', and all the ducts 11 thereof are commonly connected to the respective fluid inlet 87 and fluid outlet 83, even if FIGS. 26-27 show, as partial examples, only two ducts 11 connected to the respective inlet 87 and fluid outlet 83, while FIG. 28 shows more of such connections of ducts 11, and FIG. 24 shows one connection only.

FIGS. 26-27 show and confirm other advantageous details of this embodiment explained in relation to FIGS. 24-28:
the set of trays/layers/composite elements comprises both the passages 65 passing through the stacked trays and said cells 64' of a vehicle electric battery individually arranged in the passages 65,
the cells 64' are arranged in thermal exchange with the trays on first sides of the cells; lateral convex side 64c of each cell in the example,
the channels 11 are connected to the first supply 77 of fluid 15 to be circulated in said channels,
a cooling plate 69 is arranged in thermal exchange with the cells on second sides 64a thereof, and
the cooling plate having ducts 71 which are connected to a second supply 73 of a fluid (which may be a liquid) to be circulated in said ducts 71, for a thermal exchange with the cells.

The cooling plate, with a series of ducts 71 passing therein, in the plane of the cooling plate, may extend under the electric battery pack and the thermal management elements 1.

In other words:
with cylindrical cells 64' extending, through the successive passages 65 of the stacked trays, from the first side 64b of each cell, where the anode and the cathode are located, up to said second side 64a (bottom or base) of each cell,
the cooling plate 69 will be arranged in thermal exchange with the bases 64a of the cells 64'.

In FIG. 29 is illustrated an alternative embodiment in which the fluid inlet 87 and the fluid outlet 83 of the cavities 11 (including if the cavities are individually internally lined with a sheath 39) are located at a same end of the sheathes and are common on said sheathes, so that the sheaths are individually adapted so that the fluid flows back and forth in each sheath; see the arrows in FIG. 29.

In other words, each cavity 11 (or sheath 39) is adapted so that the fluid 15 flows back and forth through said common fluid inlet 87 and fluid outlet 83: each cavity 11 (or sheath 39) will have an opening at one end and a closed wall at the opposite end.

The (open) end of each cavity 11 (or sheath 39), where the commonly formed fluid inlet 87 and fluid outlet 83 is located, will preferably be the bottom end, so that, if liquid, the fluid 15 circulating in the respective cavities will flow back by gravity.

Neither cavity 11 nor sheath 39 has any fluid communication with the ducts 71 in the cooling plate 69. They are physically separated.

Fluid circulating in the (ducts of the) cooling plate 69 has no communication with fluid 15 circulating in each cavity 11 (or sheath 39). Preferably, these respective fluids will have no thermal exchange therebetween.

The invention claimed is:

1. A structure comprising at least one thermal management element comprising a composite body made of a composite material containing at least one phase change material disposed in a rigid structuring matrix, such that the composite body is self-supporting regardless of the phase of the phase change material contained,
the composite body comprises cavities, at least one cavity defines by itself a wall of a channel suitable for circulating a fluid,
the composite body defining a tray which presents a thickness and opposite faces, said channels extending on at least one of the opposite faces of the tray, and
wherein passages are formed in the thickness of the tray between the channels, the passages are through holes arranged to receive external elements to be in thermal exchange with the fluid.

2. The structure according to claim 1, wherein the rigid structuring matrix comprises an elastomer or fibers.

3. The structure according to claim 1, wherein the rigid structuring matrix comprises a graphite felt.

4. The structure according to claim 1, further comprising sheathes that are arranged within cavities of the composite body, and adapted for circulating said fluid, and wherein each one of the sheathes has an inlet and an outlet for the circulation of the fluid.

5. The structure according to claim 4, wherein said cavities are arranged parallel to the passages, so that the cavities pass through the composite body and open each on said opposite faces.

6. The structure according to claim 4, wherein each one of the sheathes is arranged in a cavity formed as a blind hole within the composite body and wherein the inlet and the outlet of each one of the sheathes are the same and are located at an open a end of the sheath, so that the fluid flows back and forth in each sheath.

7. A set of structures comprising a plurality of structures, each according to claim 1, wherein said channels are arranged adjacent, back to back, on said faces of each tray opposite to each other according to the thickness, the trays being stacked, successively applied one on top of the other, so that one said tray forms a cover for the adjacent tray, thus creating said channels which each have a closed section.

8. A set of structures comprising a plurality of structures, each according to claim 1, wherein the trays are stacked, successively one on top of the other.

9. The set according to claim 8, wherein each tray further comprises sheathes, wherein each one of the sheathes is arranged within a cavity of the composite body, and is adapted for circulating said fluid, and has an inlet and an outlet for the fluid.

10. The set according to claim 9, wherein each one of the sheathes is arranged in a cavity formed as a blind hole within the composite body and wherein, the inlet and the outlet of each one of the sheathes are the same and are located at an open end of the sheath so that the fluid flows back and forth in each sheath through the open end.

11. The set according to claim 8, wherein said cavities are arranged parallel to the passages, so that the cavities pass through the composite body and open each on said opposite faces.

12. The set according to claim 7, which further comprises sheathes which:
   are adapted for circulating said fluid:
   each has an inlet and an outlet for the fluid,
   each integrates several elongated recesses, each one of the recesses being adapted to be received in one of said cavities, and
   each is placed between two successive trays.

13. The set according to claim 7, wherein the channels extend in several directions so as to cross each other and are arranged in a staggered manner in one of the directions.

14. An assembly comprising:
the structure according to claim 1, wherein the passages pass through the tray, and
said external elements are cells of a vehicle electric battery, each cell being arranged in one of the passages.

15. An assembly comprising:
the set according to claim 7, wherein the passages pass through the stacked trays, and
said external elements are cells of a vehicle electric battery, each cell being arranged in one of the stacked passages of the stacked trays.

16. An assembly comprising:
the set according to claim 8, wherein the passages pass through the stacked trays, and
said external elements are cells of a vehicle electric battery, each cell being arranged in one of the stacked passages of the stacked trays.

17. The assembly according to claim 15,
wherein the cells are arranged in thermal exchange with the trays on first sides of the cells, the channels being connected to a first supply of the fluid able to circulate in said channels, and,
which further comprises a cooling plate arranged in thermal exchange with the cells on second sides thereof, the cooling plate having ducts which are connected to a second supply of a fluid able to circulate in said ducts, for a thermal exchange with the cells.

18. The assembly according to claim 16,
wherein the cells are arranged in thermal exchange with the trays on first sides of the cells, the channels being connected to a first supply of the fluid able to circulate in said channels, and,
which further comprises a cooling plate arranged in thermal exchange with the cells on second sides thereof, the cooling plate having ducts which are connected to a second supply of a fluid able to circulate in said ducts, for a thermal exchange with the cells.

19. The assembly according to claim 18:
wherein the cells are cylindrical and extend through successive passages of the stacked trays, each cell having a top comprising an anode and a cathode, and a base, and,
wherein the cooling plate is arranged in thermal exchange with the bases of the cells.

* * * * *